US 8,451,718 B2

(12) United States Patent
Kishore et al.

(10) Patent No.: US 8,451,718 B2
(45) Date of Patent: May 28, 2013

(54) FLOW CONTROL AND CONGESTION CONTROL IN A DATA DISTRIBUTION NETWORK

(75) Inventors: K. R. Kishore, Saratoga, CA (US); Mohan Kalkunte, Sunnyvale, CA (US); Chien-Hsien Wu, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 718 days.

(21) Appl. No.: 10/825,654

(22) Filed: Apr. 16, 2004

(65) Prior Publication Data

US 2004/0264378 A1    Dec. 30, 2004

Related U.S. Application Data

(60) Provisional application No. 60/483,025, filed on Jun. 27, 2003, provisional application No. 60/529,618, filed on Dec. 16, 2003.

(51) Int. Cl.
*G01R 31/08* (2006.01)
*H04L 12/26* (2006.01)

(52) U.S. Cl.
USPC ........... 370/229; 370/231; 370/236; 709/232; 709/235

(58) Field of Classification Search
USPC .................. 370/229, 216, 241, 236, 237, 230, 370/445, 447, 448, 461, 322, 338, 348; 709/232, 709/230, 235
See application file for complete search history.

(56) References Cited

U.S. PATENT DOCUMENTS

| 6,405,258 | B1 * | 6/2002 | Erimli et al. | 709/235 |
|---|---|---|---|---|
| 6,424,624 | B1 * | 7/2002 | Galand et al. | 370/231 |
| 6,504,818 | B1 * | 1/2003 | Levine | 370/229 |
| 6,980,520 | B1 * | 12/2005 | Erimli | 370/236 |
| 7,006,438 | B2 * | 2/2006 | West et al. | 370/231 |
| 7,158,480 | B1 * | 1/2007 | Firoiu et al. | 370/235 |
| 7,599,292 | B1 * | 10/2009 | Gupta et al. | 370/235 |
| 2002/0089994 | A1 * | 7/2002 | Leach et al. | 370/412 |
| 2002/0136163 | A1 * | 9/2002 | Kawakami et al. | 370/229 |
| 2003/0147385 | A1 * | 8/2003 | Montalvo et al. | 370/389 |
| 2003/0185249 | A1 * | 10/2003 | Davies et al. | 370/535 |
| 2003/0219027 | A1 * | 11/2003 | Kim et al. | 370/419 |
| 2004/0085904 | A1 * | 5/2004 | Bordogna et al. | 370/236 |

* cited by examiner

*Primary Examiner* — Hassan Phillips
*Assistant Examiner* — Saba Tsegaye

(57) ABSTRACT

Methods, systems, and devices are provided for managing flow of datagram traffic, generally across networks. According to some of these methods, a flow control mechanism is used to avoid over-subscription of some ports without pausing extended areas of a network. According to other methods, a congestion control mechanism is used to minimize datagram traffic between a port sending datagrams to an over-subscribed port and the over-subscribed port itself.

30 Claims, 14 Drawing Sheets

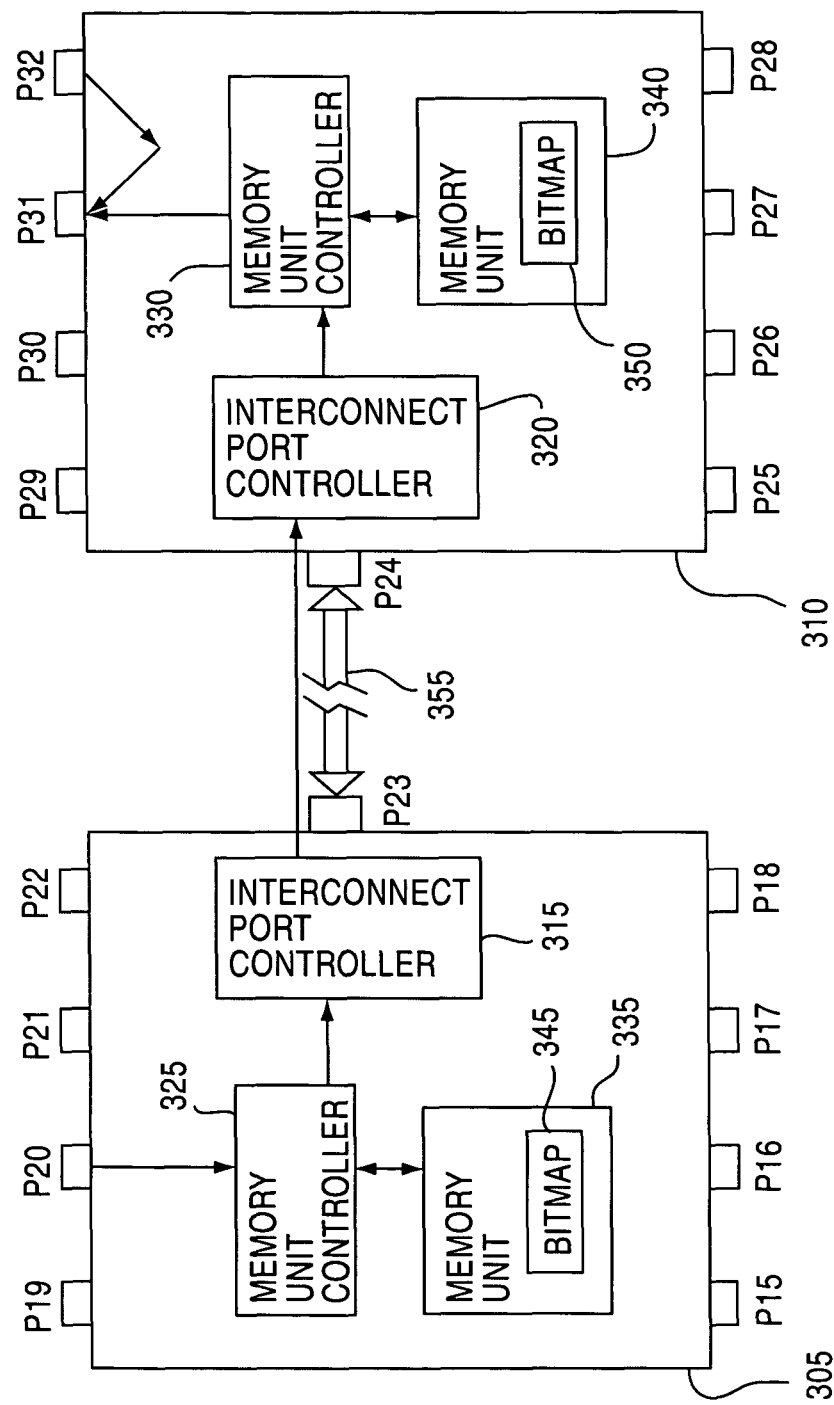

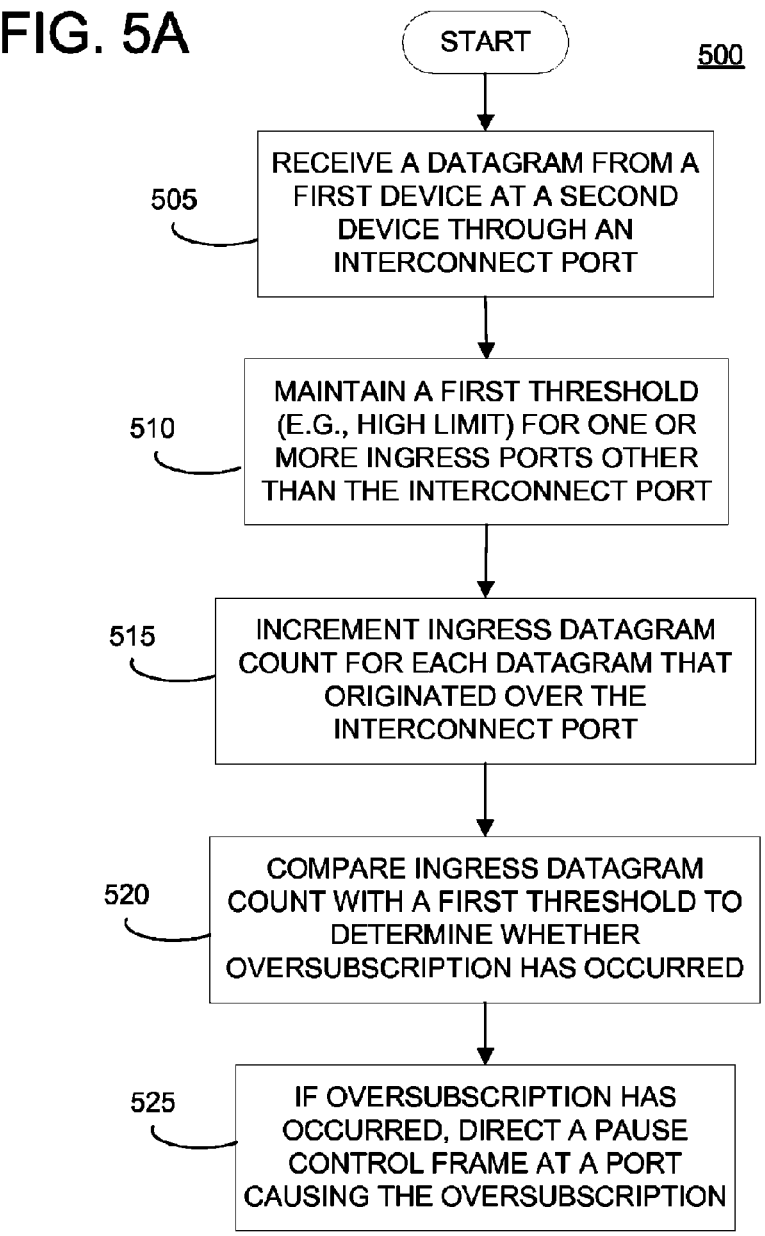

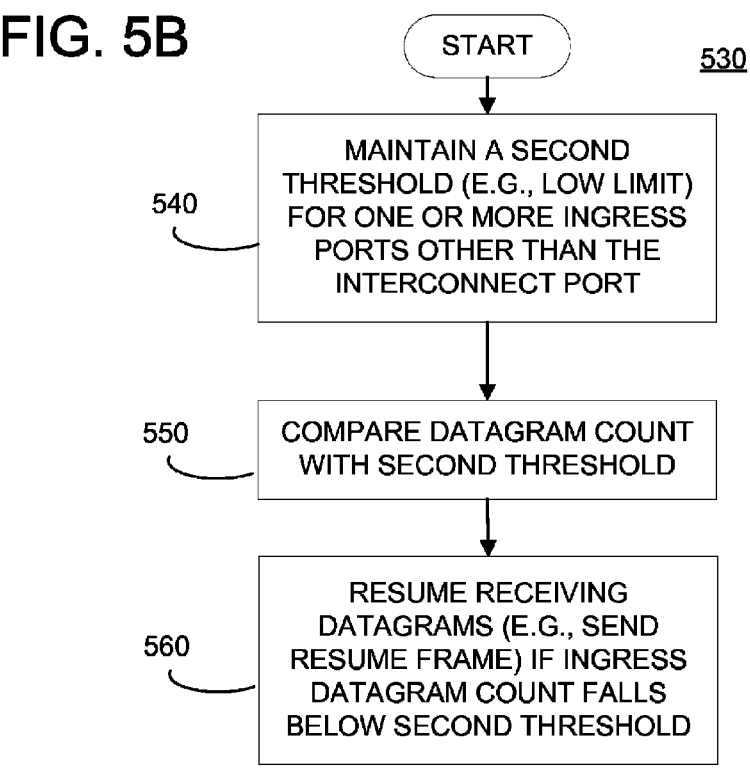

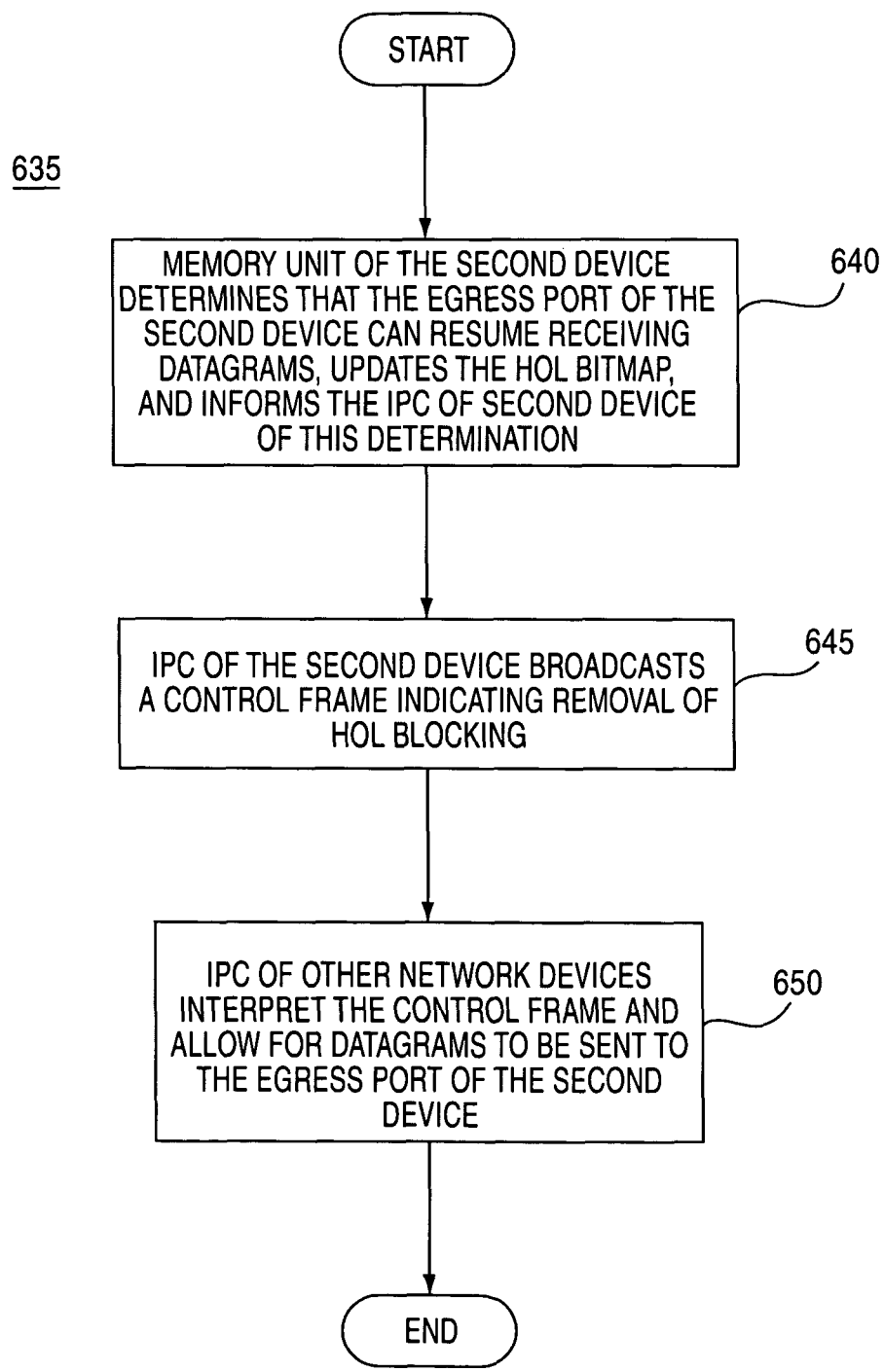

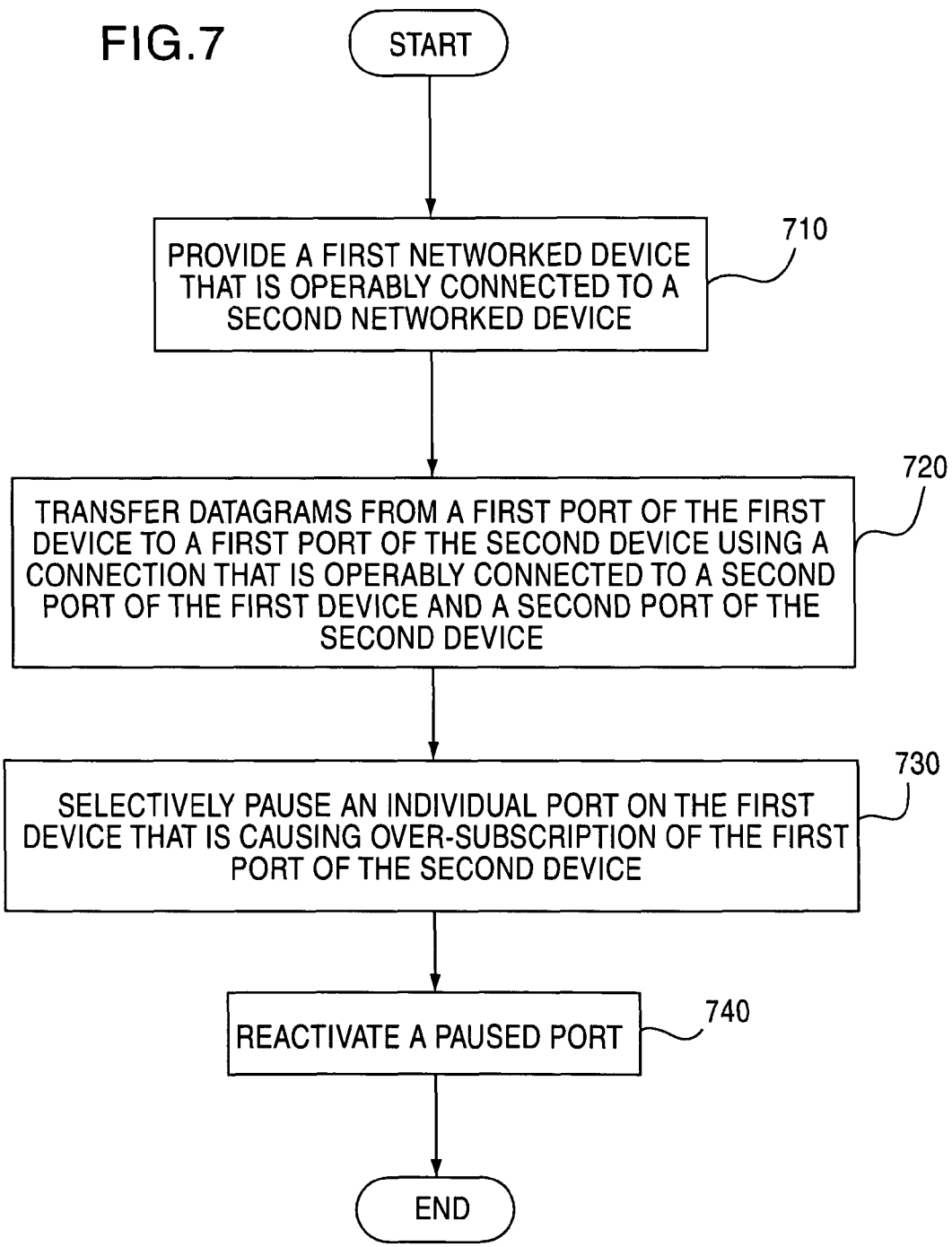

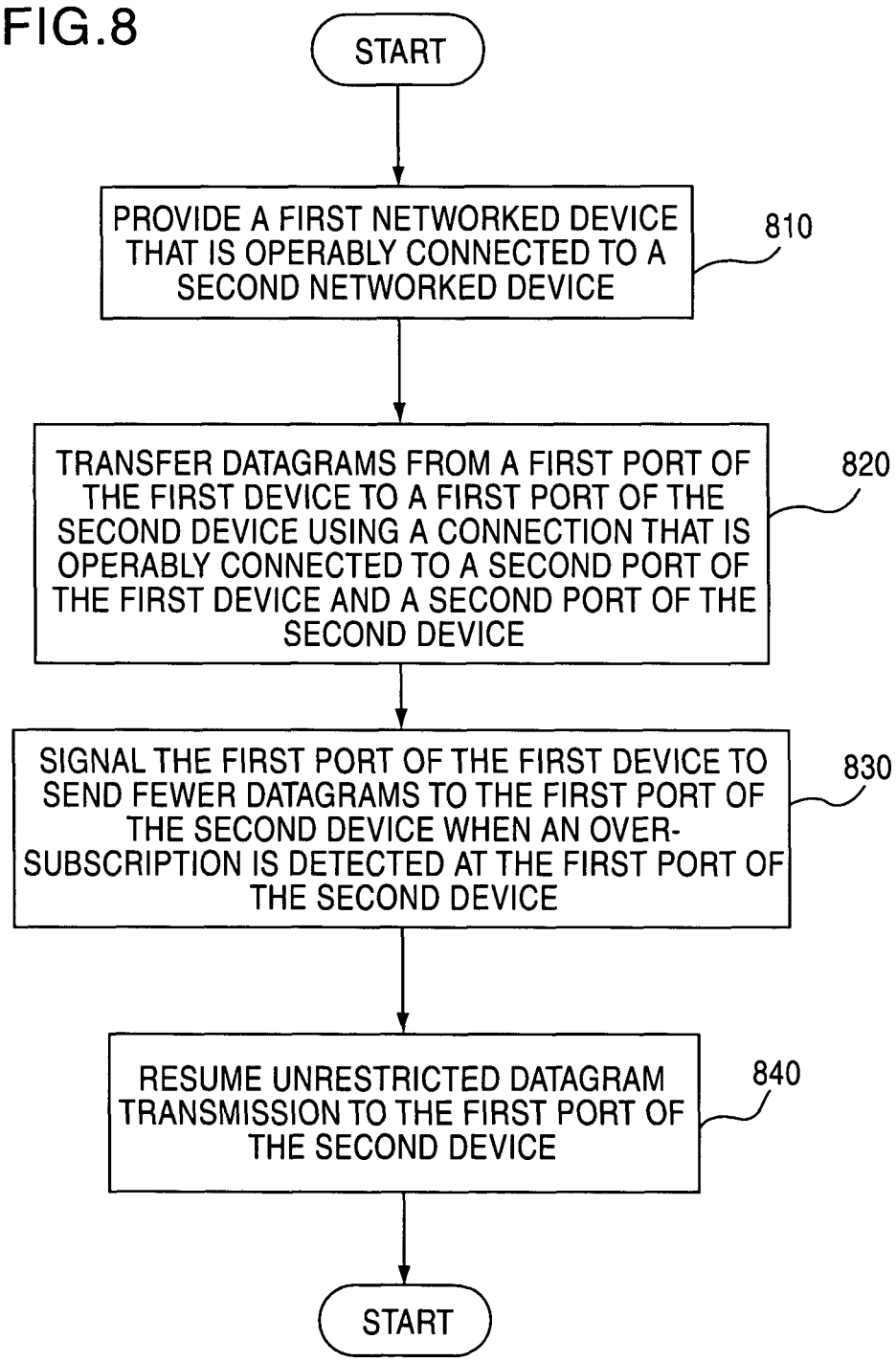

FLOW CONTROL AND CONGESTION CONTROL IN A DATA DISTRIBUTION NETWORK

CROSS REFERENCE TO RELATED APPLICATIONS

This specification claims priority from U.S. Provisional Patent Application Ser. No. 60/483,025, entitled "Flow Control and Congestion Control in XGS," and filed on Jun. 27, 2003, and U.S. Provisional Patent Application Ser. No. 60/529,618, entitled "Flow Control and Congestion Control in a Data Distribution Network," and filed on Dec. 16, 2003. The contents of the above-referenced Provisional Patent Applications are hereby incorporated in their entirety by reference.

BACKGROUND OF THE INVENTION

1. Field of the Invention

Certain embodiments of the present invention are directed generally to methods for managing flow of datagram traffic across a data distribution network. Certain other embodiments of the present invention are directed generally at methods for controlling congestion in data distribution networks. Further, additional embodiments of the present invention are directed generally to devices and systems for implementing the above-discussed methods.

2. Description of the Related Art

According to modern telecommunications networks, datagrams such as, for example, packets, cells, and bit strings, can be commonly distributed from one node, module, or device (generally referred to herebelow as network devices) on a network to one or more other network devices. During the distribution of such datagrams, the ingresses and egresses of the network devices that assist in the distribution and/or forwarding of datagrams often get congested or clogged due to over-subscription. Two examples of how over-subscription can affect a data distribution network device are shown in FIGS. 1 and 2, respectively.

FIG. 1 illustrates device D1 and device D2 that are operably connected to each other. Device D1 has ports P1-P6 that may each function as ingresses and/or egresses of datagrams from and/or to other network device (not illustrated in FIG. 1) into device D1. Device D1 also has a port P7 through which datagrams in device D1 may egress device D1 towards device D2 and through which datagrams in device D2 may ingress into device D1.

Port P7 on device D1 is operably connected to port P8 that may function as an ingress for device D2 illustrated in FIG. 1. Device D2 includes additional ports P9-P14 through which datagrams that enter through port P8 may egress from device D2 and through which device D2 may communicate with other network devices (not illustrated in FIG. 1).

According to the related art devices illustrated in FIG. 1, port P5 on device D1 and port P14 on device D2 may both wish to simultaneously transmit datagrams to port P13 on device D2. Under such circumstances, datagrams from port P5 travel through port P7 of device D1 and through port P8 of device D2 before arriving at port P13.

When, as shown in FIG. 1, a pathway 100 between port P7 and port P8 is capable of supporting a flow of datagrams higher than either port P5 or port P13 would be able to accommodate individually, pathway 100 between port P7 and port P8 may be used as or replaced with a high-speed and/or high-capacity pathway that can support a high volume of datagram traffic. In fact, under ideal situations, a high-speed/capacity pathway is able to support flow of datagrams between many different ports on device D1 and device D2, all simultaneously.

It should be noted that the pathways discussed herein are generally not physical connections. Rather, these pathways often are made up of a series of data distribution devices, such as, for example, routers and switches, that, at least for a brief period of time, allow a datagram to travel from a source to a destination on a network.

Because, in FIG. 1, ports P1-P6 and P9-P12 all have the same capacity for allowing datagrams to ingress/egress devices D1 and D2, port P13 is over-subscribed because it is simultaneously receiving full-streams of datagrams from both port P14 and port P5, thereby exceeding port P13's capacity for egressing received datagrams. Once this over-subscription condition on P13 is detected in device D2, according to the related art, a "pause" frame is sent to port P8 and port P14 within device D2.

Once port P8 receives the "pause" frame, the pathway between related art network devices D1 and D2 is effectively blocked, at least for a short time interval. This is true because, in the "paused" condition, port P8 will not accept datagrams from port P7.

Once the pathway is effectively blocked between devices D1 and D2, if port P2 on device D1 and port P10 on device D2 try to exchange datagrams, the datagram exchange would not be possible. Hence, even though, in the related art example illustrated in FIG. 1, neither port P2 nor port P10 are over-subscribed, and even though there may be available bandwidth on the pathway between port P7 and port P8 which link devices D1 and D2, the "pause" frame emitted as a result of the over-subscription of port P13 has affectively shut down all communications between devices D1 and D2.

Hence, there is a need for devices, systems, and methods that prevent the over-subscription of one port on one network device from effectively shutting down either a portion of or an entire data distribution network. In other words, there is a need for better flow control of datagrams over data distribution networks.

FIG. 2 illustrates how related art devices D1 and D2 illustrated in FIG. 1 deal with an over-subscription condition on one their ports in a different manner. As in FIG. 1, port P13 in FIG. 2 is again over-subscribed because port P13 is receiving more datagrams from port P14 and port P5, via port P7 and port P8 that are connected via a high-speed/capacity pathway, than P13 can allow to egress.

In contrast to FIG. 1, in the over-subscribed condition illustrated in FIG. 2, port P13 does not send out a "pause" control frame. Rather, the first device D1 detects the over-subscription of port P13 and reacts accordingly by only allowing portions of the datagrams sent from ports P14 and P5 to reach port P13.

More specifically, in a situation illustrated in FIG. 2 where, for example, port P5 on device D1 is transmitting one Gigabit ("one Gig") of datagrams, port P14 on device D2 is transmitting one Gig of datagrams, and port P13 is only capable of egressing one Gig of datagrams, port P8 allows only, for example, half of the datagrams received from port P5 to travel to port P13. In such an example, if port P14 is similarly restricted (generally by internal components of the device D2) to only being able to forward half a Gig of datagrams to port P13, port P13 will receive the one Gig of datagrams that it can egress, and half of the datagrams received at port P8 will be dropped/lost at port P8.

Clearly, dropping of datagrams anywhere in a data distribution network is a non-ideal and non-desirable condition. Further, it is even more non-desirable for an extra half Gig of datagrams to travel between port P7 and port P8 when this half Gig of datagrams cannot be supported by port P13. This is true at least because the extra datagrams only serve to additionally congest the pathway between device D1 and device D2, which could be more effectively used by datagrams having other sources and destinations.

Hence, what is also needed are methods and devices for reducing the amount of congestion that is present in high-speed/capacity pathways between network devices. In addition, there is also a need for methods and devices that can halt the forwarding of unusable datagrams as early as possible.

SUMMARY OF THE INVENTION

According to certain embodiments of the present invention, a method of operating a telecommunications network is provided. Typically, this method includes the step of providing a first networked device that is operably connected to a second networked device. This method also commonly includes transferring datagrams from a first port of the first device to a first port of the second device using a pathway that is operably connected to a second port of the first device and a second port of the second device. In addition, this method usually includes the step of selectively pausing an individual port on the first device that is causing over-subscription of the first port of the second invention.

According to certain other embodiments of the present invention, another method of operating a telecommunications network is provided. A common first step of this method includes providing a first networked device that is operably connected to a second networked device. Typically, this method also typically includes the step of transferring datagrams from a first port of the first device to a first port of the second device using a pathway that is operably connected to a second port of the first device and a second port of the second device. This method also generally includes signaling the first port of the first device to send fewer datagrams to the first port of the second device when an over-subscription is detected at the first port of the second device.

Certain embodiments of the present invention also provide a communication system. According to some of these embodiments, a first data distribution means that is operably connected to a second data distribution means is included. Often, a first communication means, for transferring datagrams from a first port of the first data distribution means to a first port of the second data distribution means, is also provided. Further, a control means for selectively pausing individual ports that are causing over-subscription of the first port of the second data distribution means is generally provided.

According to yet other embodiments of the present invention, another communications system is provided. Typically, this system includes a first data distribution means that is operably connected to a second data distribution means. Both of these means normally may be used for distributing datagrams over a network. Generally, this system also includes communications means for transferring the datagrams from a first port of the first data distribution means to a first port of the second data distribution means. In addition, this network usually includes a control means for signaling the first port of the first data distribution means to send fewer datagrams to the first port of the second data distribution means when an over-subscription is detected at the first port of the second data distribution means.

According to other embodiments, yet another communications system is provided. In this system, a first device that is operably connected to a second device is usually provided. Also, a first controller capable of transferring datagrams from a first port of the first device to a first port of the second device are typically included. Further, a second controller capable of selectively pausing individual ports in the first device that are contributing to over-subscription of the first port of the second device are normally included.

In addition to the above, certain other embodiments of the present invention provide still another communications system. According to this communications network, a first device that is operably connected to a second device is typically provided. Also, a first controller capable of transferring datagrams from a first port of the first device to a first port of the second device is often provided. In addition, a second controller capable of signaling the first port of the first device to send fewer datagrams to the second port of the second device when an over-subscription is detected at the second port of the second device is usually provided.

BRIEF DESCRIPTION OF THE DRAWINGS

For a proper understanding of the invention, reference should be made to the accompanying drawings, wherein:

FIG. 3A illustrates two network devices according to certain embodiments of the present invention wherein a port on one of the devices is over-subscribed and FIG. 3B illustrates an embodiment of the present invention wherein the over-subscription condition illustrated in FIG. 3A has been addressed by selectively signaling an offending port that the offending port should alter the number of datagrams forwarded to the over-subscribed port;

FIG. 5A illustrates a flow chart that includes steps of methods according to certain embodiments of the present invention for distributing datagrams under a flow control mechanism;

FIG. 5B illustrates a flow chart that includes the steps of a method according to certain embodiments of the present invention wherein a network that has been paused while operating under a flow control mechanism is resumed;

FIG. 6B illustrates a flow chart that includes the steps of a method according to certain embodiments of the present invention wherein a network that has been head of line (HOL) blocked while operating under a congestion control mechanism resumes operations;

FIG. 7 illustrates a flow chart that includes the steps of a method according to certain embodiments of the present invention wherein a flow control mechanism pauses and subsequently resumes operation of a network; and FIG. 8 illustrates a flow chart that includes the steps of a method according to certain embodiments of the present invention wherein a congestion control mechanism blocks and subsequently resumes network operation.

DETAILED DESCRIPTION OF THE PREFERRED EMBODIMENTS

Figure 1:
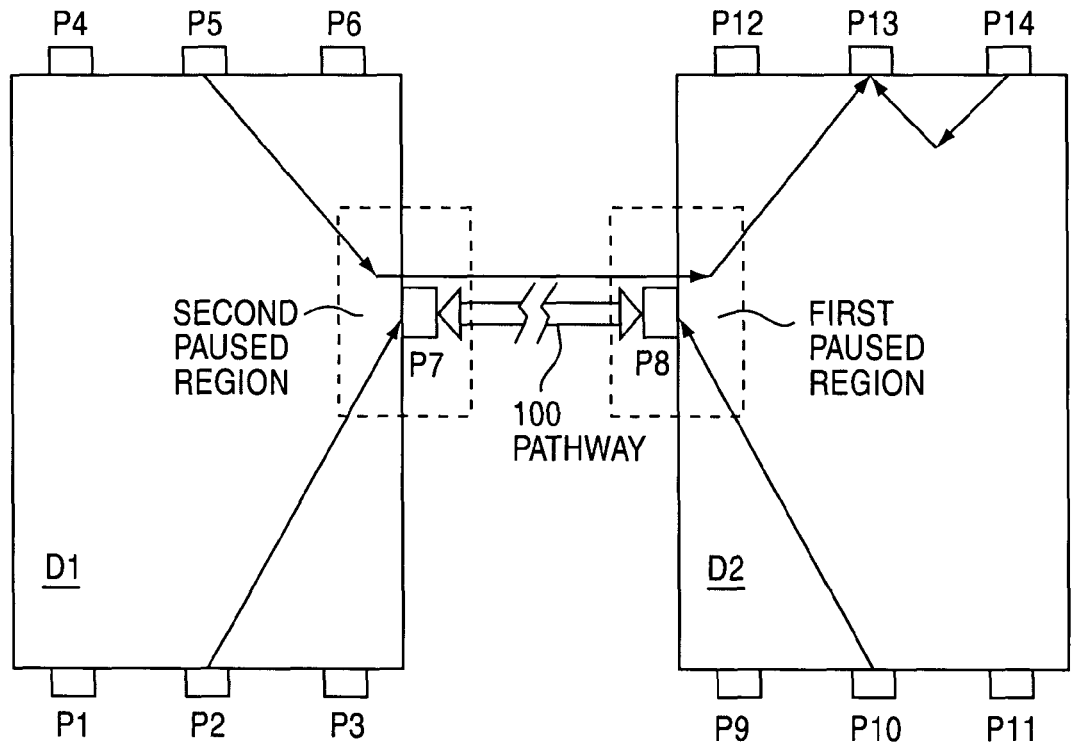
FIG. 1 illustrates a portion of a related art data distribution network wherein an over-subscription of one port in the network may cause pausing of the entire network.
Figure 2:
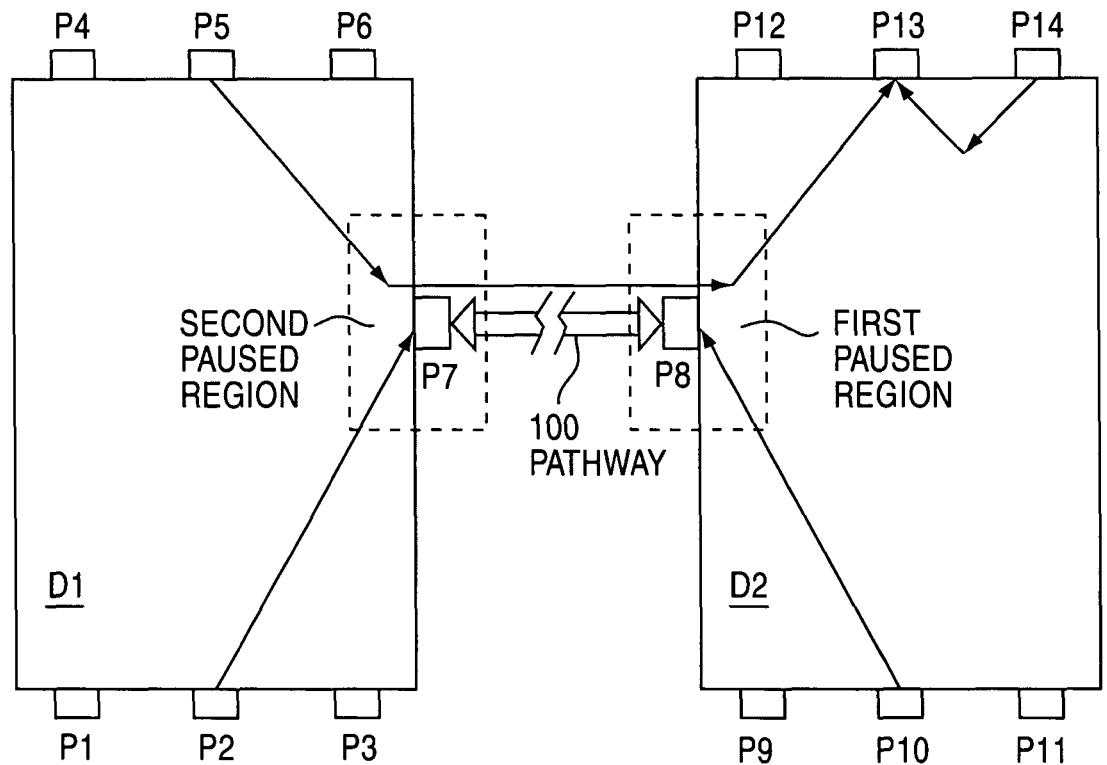
FIG. 2 illustrates the portion of the related art data distribution network illustrated in FIG. 1 wherein over-subscription of one port in the network may lead to unnecessary congestion of a high-capacity network pathway.

In order to address and overcome the shortcomings of the related art methods, systems, and devices discussed above, embodiments of the present invention include a variety of methods, devices, and systems have been developed. Some of these are discussed herebelow and illustrated in the attached figures.

FIG. 3A illustrates data distribution device 305 that is operably connected to data distribution device 310. According to certain embodiments of the present invention, each of devices 305 and 310 may be used as a means for distributing datagrams over a network.

Each device 305, 310 illustrated in FIG. 3A includes a set of ports P15-P32, an Interconnect Port Controller (IPC) 315, 320, a memory unit controller 325, 330, and a memory unit 335, 340. Each memory unit 335, 340 illustrated includes a bitmap 345, 350 or other set of instructions.

Pathway 355 is illustrated between devices 305 and 310. According to certain embodiments of the present invention, pathway 355 acts as a communication means that allow for communication between devices 305 and 310. Pathway 355 may provide for non-lossy communication between devices 305 and 310, wherein the loss/dropping of datagrams that travel between devices 305 and 310 is eliminated, or at least greatly reduced. According to certain embodiments, pathway 355 may be a physical or logical connection.

As shown in FIG. 3A, when in operation, port P20 of device 305 may forward datagrams to memory unit controller 325. Controller 325 generally references bitmap 345 in memory unit 335 operably connected thereto before forwarding the datagrams to IPC 315 of data distribution device 305. Then, using pathway 355 that effectively connects ports P23 and P24, the datagrams may be forwarded to IPC 320 of data distribution device 310.

The datagrams that reach IPC 320 are then usually forwarded to memory unit controller 330, which commonly references bitmap 350 in memory unit 340 of data distribution device 310. Then, these datagrams may be forwarded to port P31. Also, when the portion of the network illustrated in FIG. 3A is in operation, port P32 may forward datagrams to port P31.

Figure 3B:
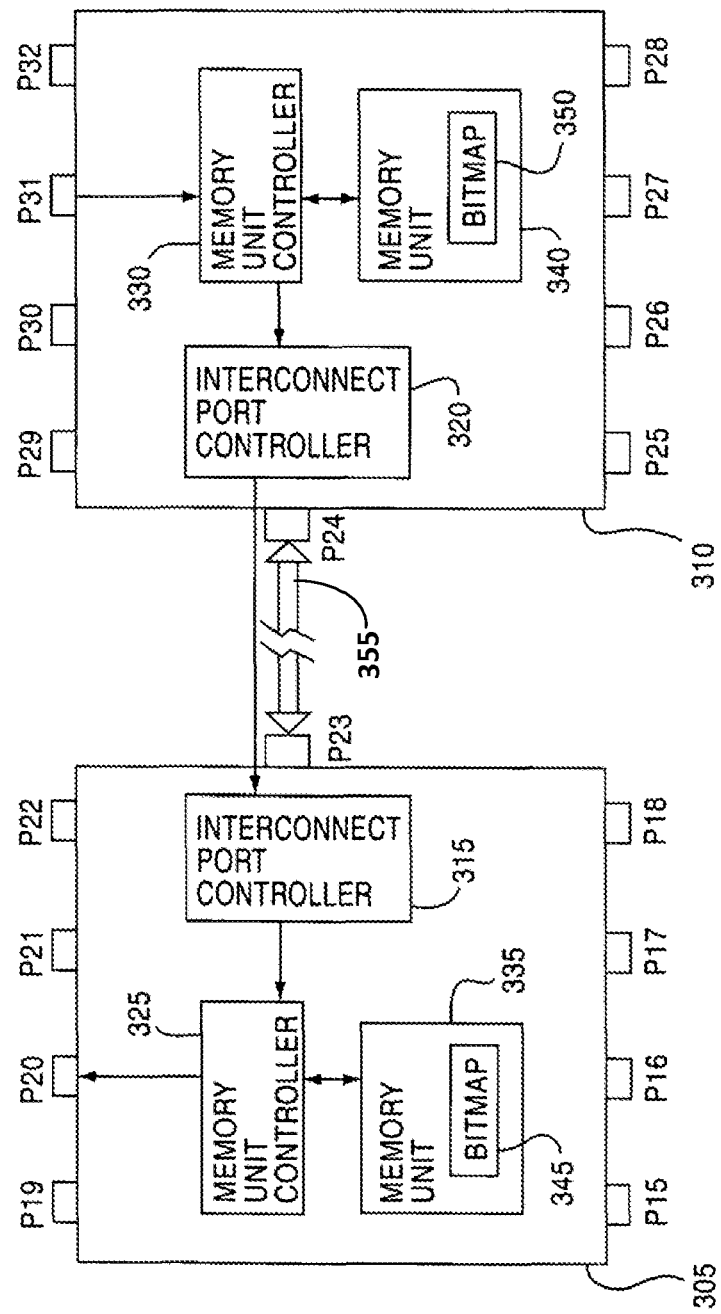

FIG. 3B illustrates how devices 305 and 310 of FIG. 3A respond, according to certain embodiments of the present invention, when the combination of the datagrams received at port P31 from port P20 and port P32 results in the over-subscription of port P31. It should be noted that, in FIG. 3B, memory unit controller 330 typically stores and/or maintains threshold values for every ingress port in devices 310 and 305. Hence, when port P20, which is an ingress port while it is sending datagrams to port P31, exceeds a threshold value maintained by memory unit controller 330, an over-subscription condition is detected.

Because the offending port in the situation above is ingress port P20, port P31 will typically be able to continue to transmit datagram traffic ingressed at ports other than port P20. However, when the above-discussed over-subscription is detected, memory unit controller 330 typically sends one or more pause frames to port P20, the ingress port that exceeded the threshold, thereby at least temporarily preventing port P20 from forwarding any additional datagrams.

In other words, according to certain embodiments of the present invention, port P20 on device 305 that contributes to the over-subscription of port P31 on device 310 may be paused selectively, without having to pause any other ports on the network. According to such embodiments, if port P16 is instructed to forward datagrams to port P27, such transmission would be possible, so long as there is adequate bandwidth available along pathway 355, even when one of the ports on the network is over-subscribed.

It should be noted that all of the controlling of ports discussed herein may be effectuated using non-memory-consuming methods of communication. Using such non-memory-consuming methods allows for information related to how individual ports should operate to flow across the network independently of network congestion.

A non-memory-consuming transaction generally does not make use of memory resources, such as the resources illustrated in memory units 335 and 340. For example, a flow control frame may be sent directly from IPC 320 to IPC 315 over pathway 355. In a non-memory-consuming transaction IPC 315 may then receive the frame and decode the frame's contents, construct messages, and update a port's state in memory unit 335 which, in turn, may take any further action necessary, such as informing port P20 to send a pause frame.

In the above-described situation, if the control frame were memory-consuming, the reception of the frame would be dependent on the memory resource available in pathway 355. However, using a non-memory-consuming transaction such as the transaction described above generally guarantees that information contained in the frame will be conveyed, regardless of the memory resources available.

Figure 4A:
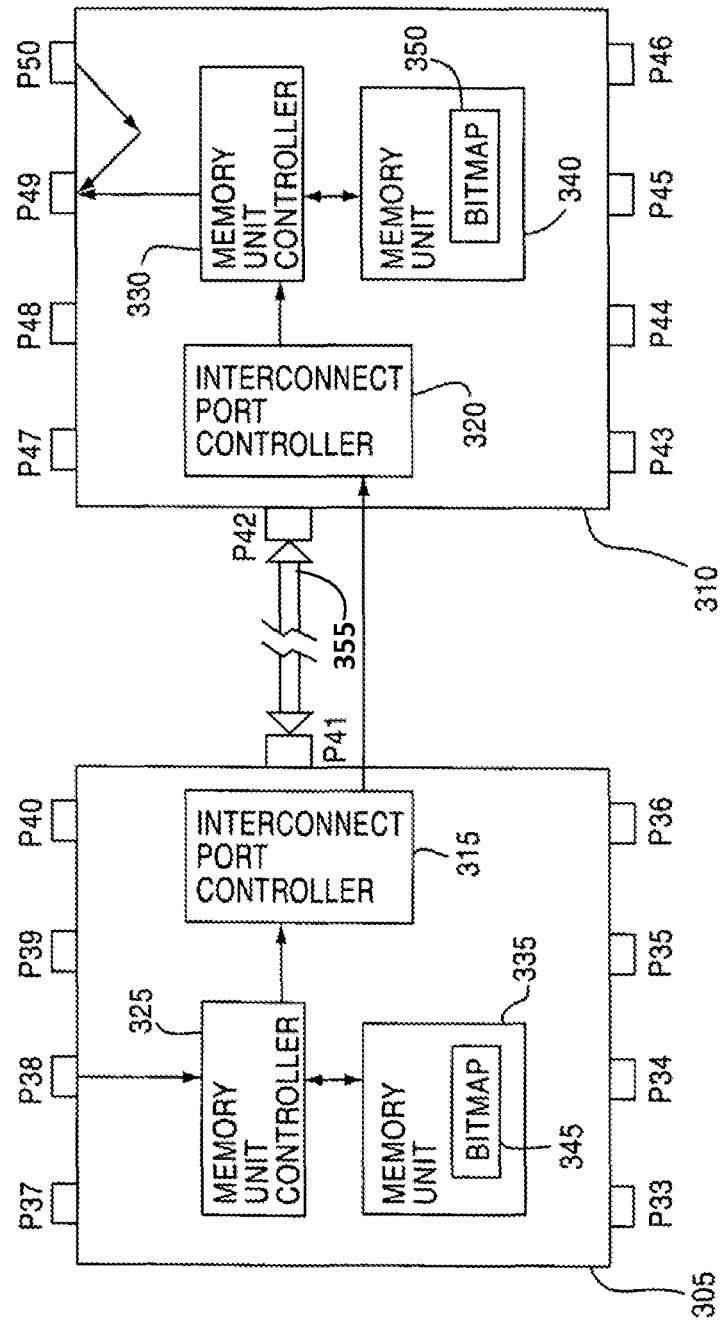
FIGS. 4A and 4B illustrate certain embodiments of the present invention wherein an over-subscription of one port in a network is addressed by signaling all other ports in at least a portion of the network that all ports should to alter the number of datagrams sent to the over-subscribed port.

FIG. 4A again illustrates above-discussed data distribution devices 305 and 310. In FIG. 4A, the forwarding of datagrams by port P38 and port P50 to port P49 results in the over-subscription of port P49. However, as will be shown in FIG. 4B, a congestion control mechanism is used to address the over-subscription issue.

Figure 4B:
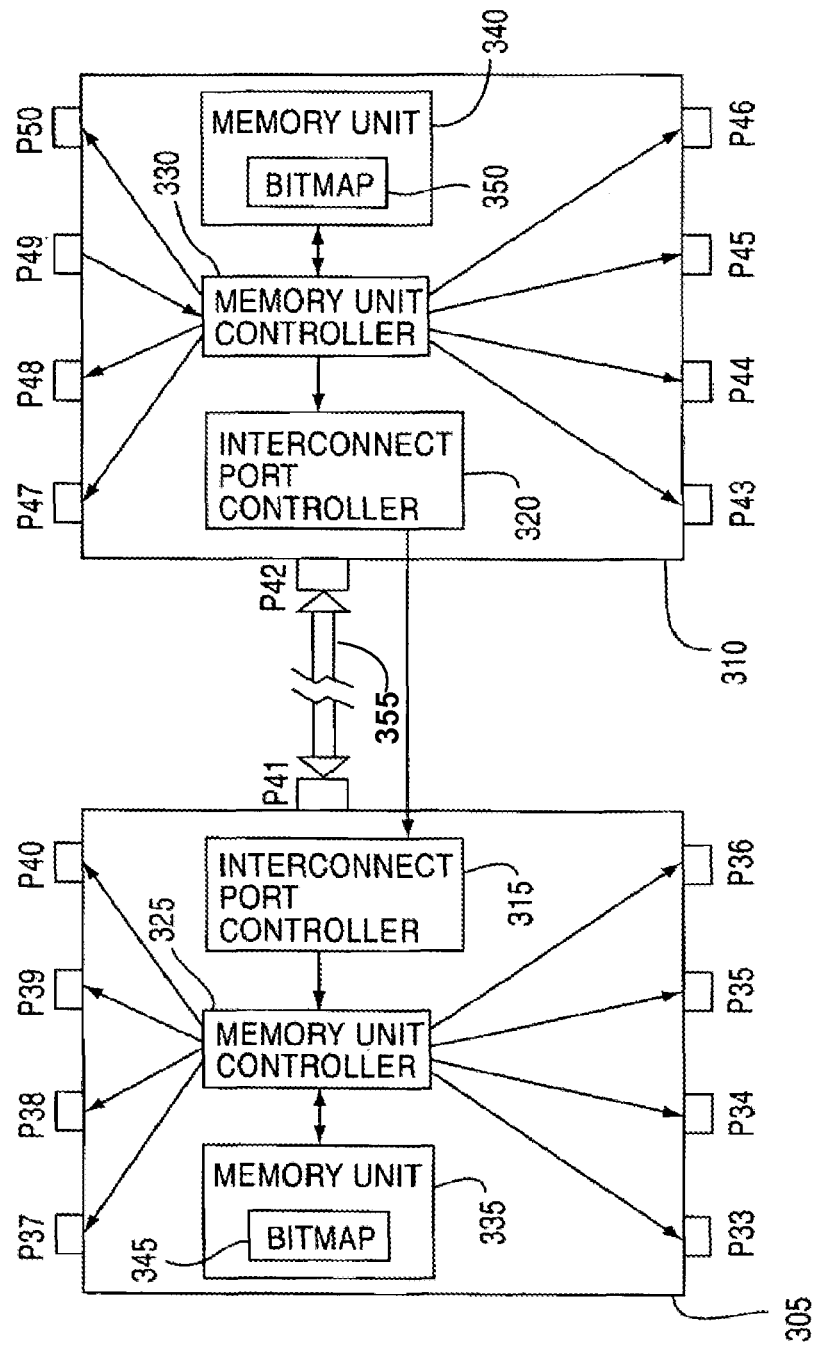

According to FIG. 4B, which illustrates a possible response mechanism for an over-subscription condition according to certain embodiments of the present invention, over-subscribed port P49 informs memory unit controller 330 of the over-subscription. Then, after updating bitmap 350 in memory unit 340 to which it is operably connected, memory unit controller 330 broadcasts to all ports within data distribution device 310 that port P49 is over-subscribed and instructs all of these other ports to either send no more datagrams to port P49 or to reduce the amount of datagrams sent to port P49 in order to eliminate the over-subscription.

According to certain embodiments, memory unit controller 330 also informs data distribution device 305, via IPC 320 and pathway 355, of the over-subscription. Data distribution device 305 then uses IPC 315 and memory unit controller 325 to update bitmap 345 to reflect the over-subscription of port P49 and to communicate with the ports on data distribution device 305 that they should either stop forwarding datagrams to port P49 or decrease the number of datagrams sent to port P49 in order to eliminate the over-subscription thereof.

In FIGS. 3A, 3B, 4A, and 4B, controllers 320, 315, 325 and 330 and pathway 355 may, according to certain embodiments of the present invention, form communications means for transferring datagrams from port P20 on data distribution device 305 to port P31 on data distribution device 310. According to certain embodiments of the present invention, all of controllers 315, 320, 325 and 330, or any individual controller or subset of these controllers, may be replaced by, for example, a more general controller capable of transferring datagrams from data distribution device 305 to data distribution device 310.

Memory means 335 and 340 and/or bitmaps 345 and 350 may, according to certain embodiments, be used as storage means for storing information concerning which ports in the network are over-subscribed. Also, although bitmaps 345 and 350 are illustrated in FIGS. 3A, 3B, 4A, and 4B, these, according to certain embodiments, may be replaced by other formats for storing information related to whether ports on the network are over-subscribed and/or for storing information concerning how much information may be sent to various ports on the network without causing over-subscriptions.

According to certain embodiments, controllers 315, 320, 325 and 330 may be replaced with more general control means for selectively pausing or curtailing the amount of datagrams sent by individual ports in the network that are causing over-subscriptions. According to certain embodiments, these controlling means may also be in the form of actual controller devices.

FIG. 5A illustrates flowchart 500, which illustrates the steps of a method, according to certain embodiments of the present invention, wherein a network such as, for example, a telecommunications network, is operated. In order to illustrate a representative implementation of the method whose steps are illustrated in flowchart 500, reference will be made to devices 305 and 310, which make up the portion of the network illustrated in FIG. 3A.

According to step 505, illustrated in FIG. 5A, a second device receives a datagram from a first device through an interconnect port. In FIG. 3A, step 505 may, for example, be implemented when a datagram originating from port P23 in first data distribution device 305 arrives at port P24 in second data distribution device 310.

Step 510 recites maintaining a first threshold for one or more ingress ports other than the interconnect port. This first threshold may be maintained, for example, in a memory control unit that is operably connected to the interconnect port and is typically a high threshold that specifies a maximum number of datagrams that may be supported. According to certain embodiments of the present invention, memory control units in each device on a network may maintain individual high thresholds, or high threshold values, for all ingress ports beyond the interconnect ports of their respective devices. In FIG. 3A, memory units 335 and 340 may each individually maintain and/or store individual high threshold values.

Step 515 recites accounting for each datagram that originated over the interconnect port by incrementing an ingress datagram count. Step 515 may, for example, be implemented by providing a counter in a first network device and incrementing the value of the counter each time that a port that provides a connection with other network devices receives a datagram. In FIG. 3A, a counter may be stored, for example, in IPC 320 of second data distribution device 310. Then, every time that port P24 receives a datagram via pathway 355, the value of the counter may be incremented.

The value of the counter is typically decremented when a datagram egresses from the device that had received the datagram. Hence, in FIG. 3A, once a datagram ingresses into second data distribution device 310 through port P24 and the counter is incremented, the counter may be decremented once the datagram egresses though any of ports P25-P32.

Step 520 recites comparing the ingress datagram count against the first or high threshold value to determine whether an over-subscription has occurred at the ingress port. Also, step 525 recites directing a pause control frame specifically at the port that caused the over-subscription when an over-subscription has occurred. In FIG. 3, step 520 may be implemented by repeatedly comparing a high threshold value that specifies whether port P24 is over-subscribed with an ingress datagram count that is incremented each time that a datagram ingresses into second data distribution device 310 through port P24. If the comparison shows that the count is greater than or equal to the high threshold value, an over-subscription is detected. Then, upon detection of this over-subscription, a pause control frame may be sent to whichever network port sent the datagram that caused the count to reach or exceed the high threshold.

The above-described set of steps, performed either individually or in combination, may be used to prevent over-subscription in network devices by pausing specific ports on the network. However, once a port has been paused, it is typically desirable to allow the paused port to resume transmitting datagrams once the over-subscription condition has been eliminated. Hence, FIG. 5B illustrates flowchart 530, which includes the steps of a representative method wherein the paused port discussed above in connection with FIG. 5A is allowed to resume forwarding datagrams.

Step 540 in FIG. 5B recites maintaining a second threshold for one or more ingress ports other than the interconnect port. Like the first threshold, this second threshold may be maintained, for example, in a memory control unit that is operably connected to the interconnect port. Unlike the first threshold, however, this second threshold is typically a low threshold limit, at which point the memory control unit determines that there are enough resources available for the ingress port to receive a datagram, as recited in step 550.

Once this second or low threshold is reached, as recited in step 560, the memory control unit may construct a "resume" frame and send it, specifically, to that ingress port that had previously been paused.

According to certain embodiments of the present invention, the re-activating of a paused port may be performed by transmitting a re-activation signal in the form of, for example, a datagram or control frame, to the paused port. According to certain embodiments, the re-activating of a paused port may be performed pursuant to the detection of a condition wherein the first port of the second device has datagram traffic flowing therethrough in an amount that is below a lower trigger value. For example, if a first port capable of supporting 1 Gig of datagram traffic becomes over-subscribed and leads to the pausing of a second port, datagram transmission from the second port may, according to certain embodiments, resume after the over-subscription of the first port has ended and only a half Gig of datagrams are being forwarded to the first port.

According to certain other embodiments, the re-activating of a paused port may occur pursuant to the passage of a pre-determined amount of time. For example, if a first port becomes over-subscribed and causes the pausing of a second port, the second port may be re-activated after a half-second time period has passed.

Figure 6A:
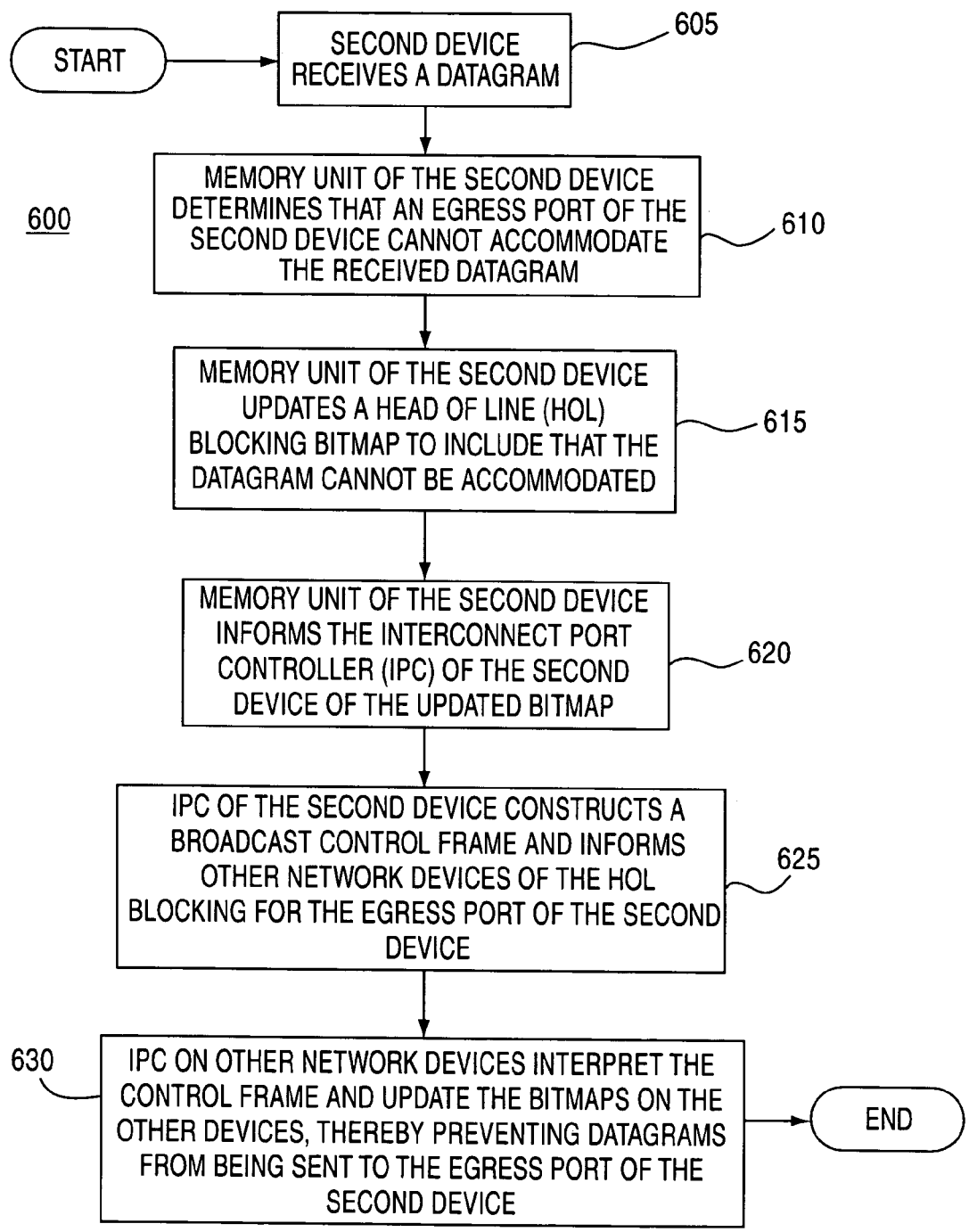
FIG. 6A illustrates a flow chart that includes the steps of a method according to the certain embodiments of the present invention wherein a congestion control mechanism is used.

FIG. 6A illustrates flowchart 600 that includes the steps of a representative method according to certain embodiments of the present invention wherein a congestion control mechanism is used. According to the step 605 in FIG. 6A, a second device receives a datagram. According to certain embodiments, the datagram is received from device 305 illustrated in FIG. 3A, but any other portion of the network that is operably connected to the device 310 illustrated in FIG. 3A may also send the datagram.

Step 610 in FIG. 6A specifies that a memory unit of the second device should determine that an egress port of the second device to which the datagram has been sent cannot accommodate the received datagram. Then, step 615 in FIG. 6A specifies that the memory unit of the second device should update a head of line (HOL) blocking bitmap to include therein that the datagram cannot be accommodated by the egress port. In FIG. 3A, bitmap 345 and/or bitmap 350 may be used as an HOL bitmap. It should also be noted that, according to certain embodiments, in addition to the bitmap that is specifically recited in step 615, any other format that stores information related to which ports are blocked/over-subscribed may be used.

Step 620 of FIG. 6A specifies that a memory unit of the second device should inform the interconnect port controller (IPC) of the second device of the updated bitmap. According to certain embodiments, after updating an HOL bitmap, a memory unit notifies the IPC to which it is operably connected of the updated HOL bitmap.

According to step 625 in FIG. 6A, the IPC of the second device should construct a broadcast control frame and should thereby inform other network devices that there is HOL blocking for the egress port of the second device discussed above. According to certain embodiments, the IPC sends out a control frame to all devices and/or ports on the network and informs them all that there is congestion/over-subscription at a port specified within the control frame.

According to step 630 of FIG. 6A, the IPC on other network devices should interpret the control frame and should update the bitmaps on the other devices to which the control frame was sent. Generally, this step prevents more datagrams from being sent to the egress ports of the second device specified above as being congested/over-subscribed.

FIG. 6B illustrates a flowchart that includes the steps of a representative method 635 for ceasing the HOL blocking that was used according to the method illustrated in FIG. 6A. In FIG. 6B, step 640 recites that the memory unit of the second device should determine that the egress port of the second device can resume receiving datagrams. Step 640 also specifies that the memory unit should update the HOL bitmap and inform the IPC of the second device of the determination made by the memory. It should be noted that, although a memory unit is specifically recited in FIG. 6B as making the detection, the detection may be made at a variety of other locations, either within or exterior to the network.

Step 645 in FIG. 6B specifies that the IPC of the second device should broadcast a control frame indicating that the HOL blocking discussed in FIG. 6A has been ceased/removed. Then, step 650 in FIG. 6B specifies that the IPC of other network devices should interpret the control frame and allow for datagrams to be sent to the egress port of the second device, is necessary/desired.

All of the methods for resuming datagram transmission from the paused ports discussed above may be used when ceasing/removing of HOL blocking of ports as well. For example, the ceasing/removing of HOL blocking of ports may occur pursuant to the sending of an appropriate datagram or control frame, the passage of a pre-determined amount of time, or after a lower trigger value has been reached.

FIG. 7 illustrates yet another method according to the certain embodiments of the present invention wherein portions of a network are paused and then resumed or reactivated. According to step 710, a first network device that is operably connected to a second networked device is provided. According to step 720, datagrams are transferred from a first port of the first device to a first port of the second device using a pathway that is operably connected to a second port of the first device and a second port of the second device. Then, according to step 730, an individual port is selectively paused on the first device, particularly when this port is causing over-subscription of the first port of the second device. Step 740 in FIG. 7 then specifies re-activating a paused port.

FIG. 8 illustrates a flowchart including steps of yet another method according to certain embodiments of the present invention wherein HOL blocking may be used and wherein resumption of datagram transmission occurs. According to step 810 illustrated, a first network device that is operably connected to a second network device is provided.

According to step 820 illustrated in FIG. 8, datagrams are transferred from the first port of the first device to a first port of the second device using a pathway that is operably connected to a second port of the first device and a second port of the first device and a second port of the second device. Then, according to step 830, a signal is sent to the first port of the first device to send fewer datagrams to the first port of the second device when an over-subscription is detected at the first port of the second device. Then, according to step 840, unrestricted datagram transmission is resumed to the first port of the second device.

Figure 9A:
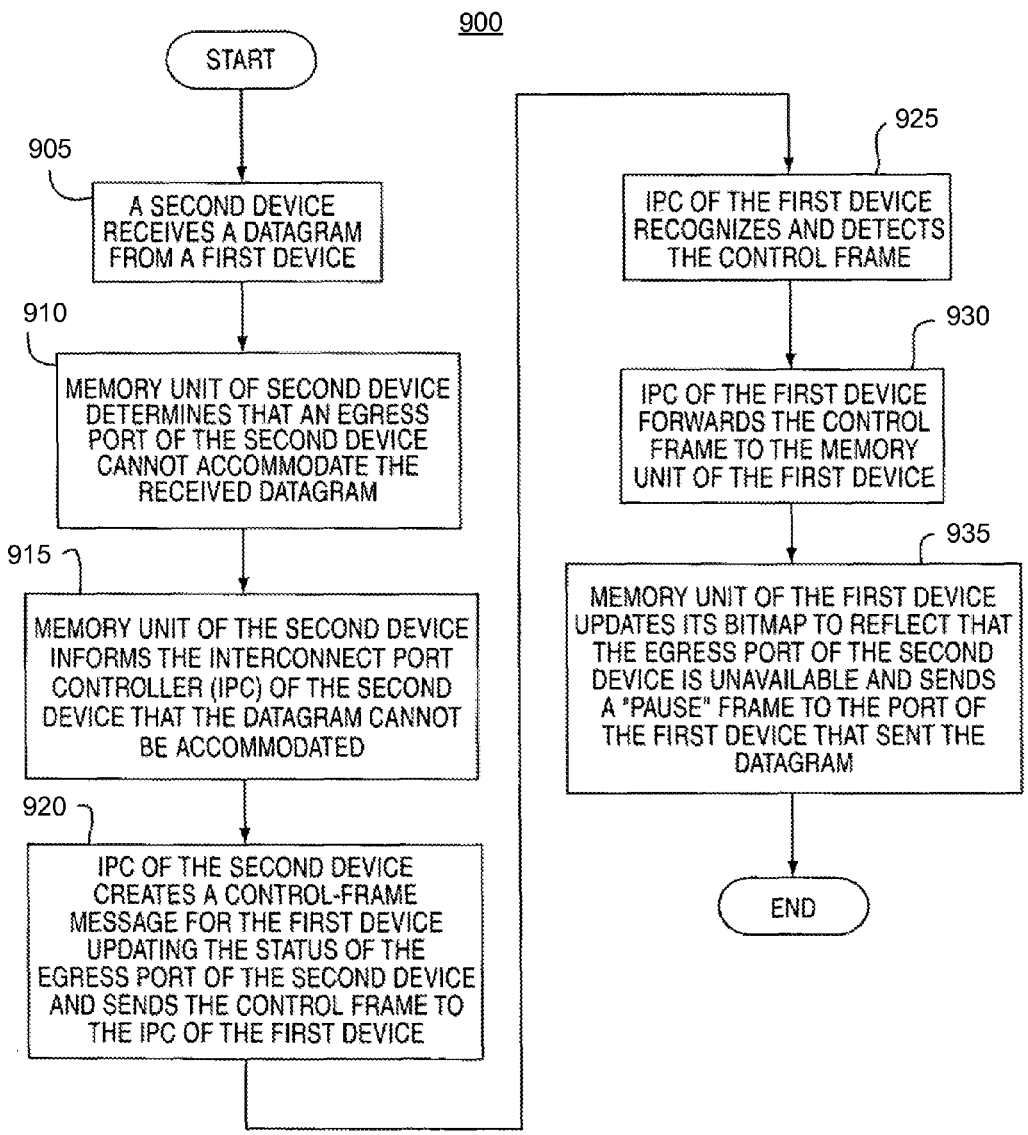
FIG. 9A is a flowchart that illustrates a method for operating a telecommunications network, according to an example embodiment.

FIG. 9A is a flowchart that illustrates the operations of an example method 900, where a network such as, for example, a telecommunications network, is operated. The representative implementation of the method 900 may be implemented using the devices 305 and 310, which make up a portion of such a network and are illustrated in FIG. 3A.

The method 900 includes, at block 905 receiving, at a second device, a datagram from a first device. At block 910, the method 900 includes determining, by a memory unit of the second device, that an egress port of the second device cannot accommodate the received datagram. At block 915, the method 900 includes, a memory unit of the second device informing an IPC of the second device that the datagram cannot be accommodated.

At block 920, the method 900 includes the IPC of the second device creating a control frame message for the first device that updates the status for the egress port of the second device and sends the control frame to an IPC of the first device. At block 925, the method 900 includes the IPC of the first device recognizing and detecting the control frame. At block 930, the method 900 includes the IPC of the first device forwarding the control frame to a memory unit of the first device. The method 900 further includes, at block 935, the memory unit of the first device updating its bitmap to reflect that the egress port of the second device is unavailable and sends a "pause" frame to the port of the first device that sent the datagram at block 905.

Figure 9B:
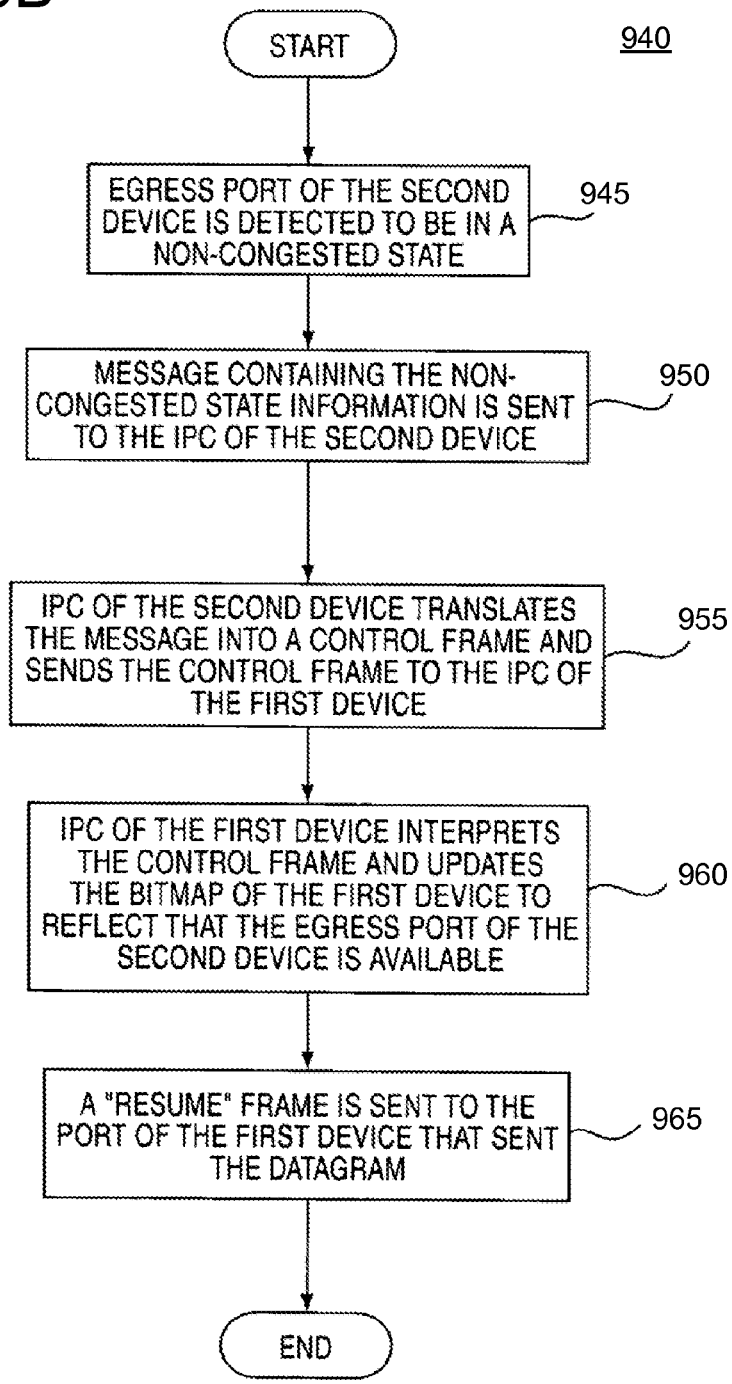
FIG. 9B is a flowchart that illustrates a method for resuming forwarding of datagrams that may be implemented in connection with the method illustrated in FIG. 9A, according to an example embodiment.

FIG. 9B is a flowchart that illustrates the operations of an example method 940, where the paused port discussed above in connection with FIG. 9A is allowed to resume forwarding datagrams. At block 945, the method 940 includes detecting that the egress port of the second device is in a non-congested state. At block 950, the method 940 includes sending a message containing the non-congested state information to the IPC of the second device. The method 940 further includes, at block 955, the IPC of the second device translating the message into a control frame and sending the control frame to the IPC of the first device.

At block 960, the method 940 includes the IPC of the first device interpreting the control frame and updating the bitmap of the first device to reflect that the egress port of the second device is available. At block 965, the method 940 includes sending a "resume" frame (e.g., from the memory unit or the IPC) to the port of the first device that sent the datagram (e.g., at block 905).

One having ordinary skill in the art will readily understand that the invention as discussed above may be practiced with steps in a different order, and/or with hardware elements in configurations, which are different than those, which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method of managing flow of datagram traffic, the method comprising:
   receiving datagrams from a first port of a first device at a first port of a second device using a pathway that is operably connected to a second port of the first device and a second port of the second device;
   determining, by the second device, that the first port of the second device is oversubscribed;
   in response to determining that that the first port of the second device is oversubscribed, transmitting a control frame indicating the oversubscription from the second device to the first device, the indication of the oversubscription being independent of an address of the first port of the first device;
   in response to, and based on the indication of the oversubscription of the first port of the second device:
      determining, by the first device, that the first port of the first device is contributing the oversubscription;
      transmitting, by the first device, a pause frame to the first port of the first device, the pause frame causing the first port of the first device to individually pause transmission of the datagrams to the first port of the second device using the pathway; and
   receiving datagrams from a third port of the first device at the first port of the second device using the pathway, while the first port on the first device is individually paused.

2. The method of claim 1, further comprising:
   re-activating the individually paused port including transmitting a re-activation signal to the individually paused port.

3. The method of claim 1, further comprising:
   re-activating the individually paused port pursuant to detection of a condition wherein the first port of the second device has datagram traffic flowing therethrough in an amount that is below a lower trigger value.

4. The method of claim 1, further comprising:
   re-activating the individually paused port pursuant to passage of a pre-determined time increment.

5. The method of claim 1, wherein the transmitting the control frame comprises transmitting an in-band control frame.

6. The method of claim 1, wherein the transmitting the control frame comprises using separate pathways between the first device and the second device to transmit datagrams and control frames.

7. The method of claim 1, wherein the transmitting the control frame is performed using non-memory-consuming communication.

8. The method of claim 1, wherein the transmitting the pause frame comprises referencing a listing of ports that are oversubscribed.

9. The method of claim 8, wherein the transmitting the pause frame comprises periodically updating the listing of ports that are oversubscribed.

10. The method of claim 1, wherein the pause frame is transmitted by a memory unit of the first device in response to the control frame.

11. A method of managing flow of datagram traffic in a network, the method comprising:
    receiving datagrams from a first port of a first device at a first port of a second device using a pathway that is operably connected to a second port of the first device and a second port of the second device;
    determining, by the second device, that the first port of the second device is oversubscribed;
    in response to determining that that the first port of the second device is oversubscribed, transmitting a control frame indicating the oversubscription from the second device to the first device, the indication of the oversubscription being independent of an address of the first port of the first device;
    in response to, and based on the indication of the oversubscription of the first port of the second device:
       determining, by the first device, that the first port of the first device is contributing the oversubscription; and
       individually signaling, by the first device, the first port of the first device to continue sending datagrams to the first port of the second device at a reduced rate; and
    receiving datagrams from a third port of the first device at the first port of the second device using the pathway that is operably connected to the second port of the first device and the second port of the second device, while continuing to receive the datagrams at the reduced rate from the first port of the first device at the first port of the second device.

12. The method of claim 11, wherein the individual signaling comprises signaling the first port of the first device to send datagrams in proportion to a total number of datagrams attempting to reach the first port of the second device.

13. The method of claim 11, wherein the transmitting is performed using non-memory-consuming communication.

14. The method of claim 11, wherein the transmitting comprises broadcasting the control frame to alert ports on a network that the first port of the second device is oversubscribed.

15. The method of claim 11, wherein the receiving datagrams from a first port of a first device at a first port of a second device comprises referencing a listing of ports on the network that are oversubscribed before transferring a datagram between the first port of the first device to the first port of the second device.

16. The method of claim 11, further comprising:
    resuming unrestricted datagram receipt at the first port of the second device including broadcasting a signal.

17. The method of claim 11, further comprising:
    resuming unrestricted datagram receipt at the first port of the second device when a total number of datagrams attempting to reach the first port of the second device falls below a lower trigger value.

18. The method of claim 11, further comprising:
    resuming unrestricted datagram receipt at the first port of the second device after passage of a pre-determined time increment.

19. The method of claim 11, wherein the transmitting the control frame comprises transmitting an in-band control frame.

20. The method of claim 11, wherein the transmitting comprises using a separate link to transmit control frames.

21. A communications device comprising:
    a first communications means for receiving datagrams from a first port of a first data distribution means at a first port of a second data distribution means in a network;

determining means for determining, by the second data distribution means, that the first port of the second data distribution means is oversubscribed;

transmitting means for transmitting a control frame from the second data distribution means to the first data distribution means, the control frame indicating the oversubscription of the first port of the second data distribution means, the indication of the oversubscription being independent of an address of the first port of the first data distribution means;

control means of the first data distribution means for selectively, individually pausing, by the first data distribution means in response to, and based on, the indication of the oversubscription of the first port of the second data distribution means, individual ports of the first data distribution means, including the first port of the first data distribution means, that are causing oversubscription of the first port of the second data distribution means; and means for receiving datagrams from a second port of the first data distribution means at the first port of the second data distribution means, while the individual ports are paused.

22. The device of claim 21 wherein the second data distribution means is connected to a second communications means that is non-lossy.

23. The device of claim 21, further comprising storage means for storing information concerning which ports in the network are oversubscribed.

24. A communications device comprising:

first communications means for receiving datagrams from a first port of a first data distribution means at a first port of a second data distribution means in a network;

determining means for determining that the first port of the second data distribution means is oversubscribed;

transmitting means for transmitting a control frame from the second data distribution means to the first data distribution means, the control frame indicating the oversubscription of the first port of the second data distribution means, the indication of the oversubscription being independent of an address of the first port of the first data distribution means;

control means of the first data distribution means for, in response to, and based on the indication of the oversubscription:

determining that the first port of the first data distribution means is contributing to the oversubscription of the first port of the second data distribution means; and individually signaling the first port of the first data distribution means to send fewer datagrams to the first port of the second data distribution means; and means for receiving datagrams from a second port of the first data distribution means at the first port of the second data distribution means, while continuing to receive datagrams from the first port of the first data distribution means at a reduced rate at the first port of the second data distribution means.

25. The device of claim 24, wherein the second data distribution means is attached to a second communications means that is non-lossy.

26. The device of claim 24, further comprising:

storage means for storing information concerning which ports in the network are oversubscribed.

27. A communications device comprising:

an interconnect port controller configured to transmit datagrams from a first port of the communications device to a first port of another communications device; and a memory unit controller configured to determine, at the communications device, individual ports on the communications device that cause oversubscription of the first port of the other communications device, wherein the interconnect port controller is configured to:

receive a signal from the other communications device, the signal indicating the oversubscription, the signal indicating the oversubscription being independent of respective addresses of the individual ports on the communications device; and selectively and individually pause ports of the individual ports on the communications device that are causing oversubscription of the first port of the other communications device based on the indication of the oversubscription of the first port of the other communications device.

28. The device of claim 27, further comprising:

a memory unit configured to store information concerning which ports in the device are oversubscribed.

29. A communications device comprising:

an interconnect port controller configured to transmit datagrams from a first port of the communications device to a first port of another communications device in a network; and a memory unit controller configured to determine, at the communications device, individual ports on the communications device that cause oversubscription of the first port of the other communications device, wherein the interconnect port controller is configured to:

receive a signal from the other communications device, the signal indicating the oversubscription, the signal indicating the oversubscription being independent of respective addresses of the individual ports on the communications device causing the oversubscription; and in conjunction with the memory controller, individually instruct the individual ports on the communications device contributing to the oversubscription to continue sending datagrams to the first port of the-other communications device at a reduced rate in response to the indication of the oversubscription.

30. The device of claim 29 further comprising:

a memory unit configured to store information concerning which ports in the network are oversubscribed.

* * * * *